March 24, 1959 T. G. HARE 2,879,025
FAUCET WITH BALL BEARING MOUNTED SEAL
Filed Nov. 1, 1954

INVENTOR.
TERENCE G. HARE
BY
Barnes, Kisselle, Laughlin & Raisch
ATTORNEYS.

United States Patent Office 2,879,025
Patented Mar. 24, 1959

2,879,025

FAUCET WITH BALL BEARING MOUNTED SEAL

Terence G. Hare, Detroit, Mich., assignor to Miller Manufacturing Co., Detroit, Mich., a corporation of Michigan Application November 1, 1954, Serial No. 465,840

5 Claims. (Cl. 251—88)

This invention relates to a faucet or valve having a rotary control member with a seal member mounted on an anti-friction bearing so that when the seal member is engaged and released from its seat, there is no relative rotary movement between the seal member and its seat.

The object of the invention is to provide an improved construction capable of manufacture economically and with facility and which embodies a strong construction with a minimum number of parts. To this end only two major elements are embodied in the structure other than the ball bearing elements and these two elements are permanently and rotatably united by shaping metal parts of one into interengaging position with parts of the other.

The invention is disclosed in the accompanying drawings.

Figure 1:
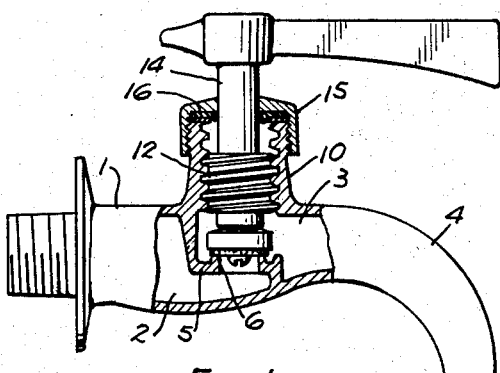
Fig. 1 is a general view of a faucet constructed in accordance with the invention with some parts shown in section.

A valve is shown in Fig. 1 of the type normally termed a faucet, and, of course, the invention is applicable to any valve although it may be particularly useful in faucets used in plumbing. The faucet has a body 1 with an inlet chamber 2, an outlet chamber 3 which leads to a spigot 4. A partition 5 separates the chambers and the partition has a port therein defined by a valve seat 6. The body has an internally threaded extension 10 and a valve member 12 has a threaded body engaged with the internal threads. An operating stem 14 projects through a cap 15 which is threaded to the body of the faucet. A sealing washer of rubber or the like, as shown at 16, engages the stem to prevent leaks and the stem has an operating handle 17.

Figure 2:
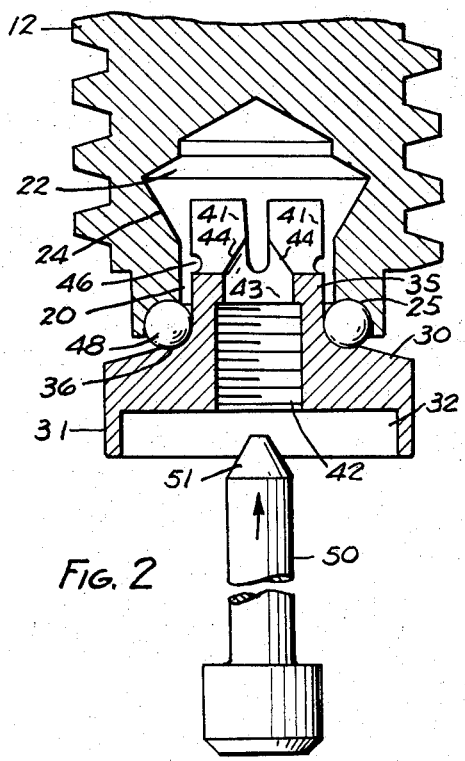
Fig. 2 is an enlarged cross sectional view showing parts before final assembly.

The body 12 is formed as shown in Fig. 2 with a re-entrant recess. The recess has a cylindrical portion 20 and an enlarged or re-entrant inner portion 22 which has an internal inclined or conical surface 24. The end of the body adjacent the outer end of the portion 20 of the recess is formed with a circumferential raceway 25.

There is a holder for the sealing washer illustrated at 30. It may have a circumferential flange 31 defining a recess 32 for receiving sealing washer 34. This holder has an extension 35, and at the juncture of the extension 35 and the body of the holder is a raceway 36.

Figure 4:
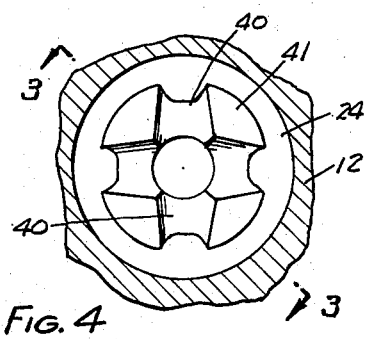
Fig. 4 is a sectional view taken substantially on line 4—4 of Fig. 3.

The end of the extension 35 is segmented as shown in Fig. 4. This is accomplished by slots or kerfs 40. Preferably, there are two kerfs formed at right angles to each other and thus intersecting. This provides four segments 41.

The holder is provided with an axial internally threaded aperture 42. Extending from the aperture 42 and concentric therewith is a recess 43 which terminates at its upper end, using the term "upper" relatively, and in connection with Fig. 2, in an inclined manner so that each segment 41 has an internal inclined face 44. At the base of the segments there is formed a circumferential groove 46. The recess 43 and the inclined faces 44 may be formed by a boring tool provided with a properly shaped end for boring out the metal to provide the cavity 43 and the inclined faces 44.

The extension 35 passes freely into the portion 20 of the recess in the body 12 as shown in Fig. 2 and an annulus of ball bearings 48 is disposed in the matching raceways 25 and 36.

Figure 3:
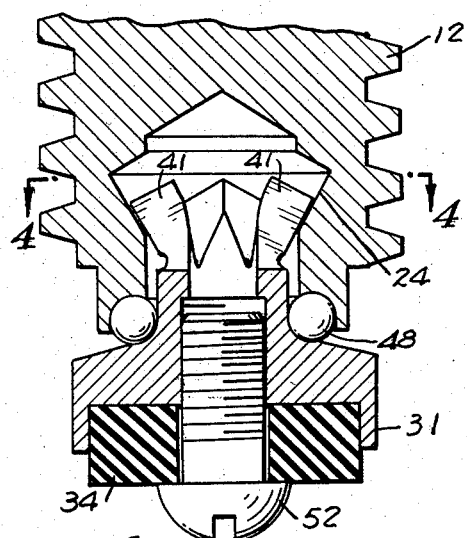
Fig. 3 is a cross sectional view similar to Fig. 2 taken on line 3—3 of Fig. 4 illustrating the parts assembled.

With the parts thus assembled as shown in Fig. 2, a suitable tool 50, advantageously with a tapered end 51, is passed into and through the threaded bore 42 and extension 43. This tool engages the inclined faces 44 of the segments and bends the segments outwardly on bend lines located substantially at the circumferential recess 46. The metal of the segments is bent beyond its elastic limit so that upon removal of the expanding tool 50 the segments take a position as shown in Fig. 3. Thus the outer surfaces of the segments engage and lock behind the internally coned wall 24. Thus the holder 30 is permanently and rotatably united with the body 12 of the valve member.

To further explain the structure and its operation, and to set forth how the ball bearings are not subjected to a binding action, the following example may be given: The angle between the faces 44 may, for example, be about 60°. In other words, each face 44 is at an angle of 30° from an axial line through the member 30. Similarly, the angle of the internal conical face 30 is at about 30° from an axial line passing therethrough. The expanding tool is of such dimensions that when it is passed in between the segments the segments are bent outwardly about 30° and thus contact with the internal cone surface. However, when the expanding tool is removed, the metal of the segments returns back slightly to provide a nicety of clearance between the segments and the internally coned wall. This nicety of clearance provides for free rotation of the holder relative to the body of the valve member and at that same time provides the necessary play or freedom of movement axially between the holder and the body of the valve member so that the ball bearings are not subjected to a binding action but, to the contrary, have free movement between the races. By providing the annular groove 24, the metal at the base of the segments is not bent sharply but is bent more gradually and somewhat on a radius substantially at the location of the circumferential groove. After the expanding tool has been removed the sealing washer 34 may be located and it may be held in position by a screw 52 threaded into the recess 42.

Thus, the structure embodies two principal portions, namely, the valve member and the holder, permanently and rotatably united with the annulus of balls therebetween. In this analysis the washer 34 and its holding screw 52 are not included as these are standard parts in any faucet of this type.

I claim:

1. A valve structure comprising a valve member adapted to be moved toward and away from a seal in a valve body, a washer holder of readily permanently deformable material, said valve member having a circular reentrant recess adjacent the lower end thereof and an opening providing communication between said recess and the lower end of said valve member, the diameter of said opening being less than the largest diameter of said reentrant recess, an annular raceway on said valve member extending around the lower end thereof, a complementary annular raceway on the holder, an annulus of balls between the raceways, said holder having an axial extension projecting upwardly through said opening into said recess of the valve member, said holder having an axial bore therethrough, and means for permanently and rotatably securing the holder with the valve member comprising a plurality of integral segments on the upper end of said axial extension, each said segment having an upper end portion of radially enlarged cross section connected with the holder by a lower end portion of reduced radial cross section, said upper end portion of each said segment having a curved outer surface, said recess in said valve member having an annular seating surface extending radially outwardly from the upper end of the opening at an angle with the axis of said opening and forming a shoulder, each said segment being permanently deformed beyond its elastic limit at said radially reduced portion in a radially outward direction to a position wherein said curved outer surface is closely adjacent said shoulder so as to permanently secure together the holder and the valve member and permit free rotation of said holder relative to said valve member, each said segment having its upper end portion extending radially inwardly of said bore prior to its being deformed outwardly, the radially innermost portions of the upper end portions of said segments defining a circle concentric with the axis of the bore, said bore extending to said segments and providing a pilot passageway for a tool which when driven upwardly through the bore past said shoulder during assembly is adapted to engage the radially inwardly extending portions of said segments to permanently deform the segments radially outwardly into closely adjacent relationship to said shoulder, a washer, means for removably securing said washer on the lower end of said holder, the position of said segments being unaffected by operation of said latter means to effect removal of said washer.

2. The combination set forth in claim 1 wherein the lower end of said axial bore is threaded, said means for removably securing said washer on the lower end of said holder comprising a headed screw in threaded engagement with the threaded portion of the bore.

3. The combination set forth in claim 2 wherein the upper end of said screw terminates below the radially innermost portions of the segments.

4. The combination set forth in claim 1 wherein said annular seating surface in said valve member is conical.

5. A valve structure comprising a valve member adapted to be moved toward and away from a seal in a valve body, a washer holder of readily permanently deformable material, said valve member having a circular reentrant recess adjacent the lower end thereof and an opening providing communication between said recess and the lower end of said valve member, the diameter of said opening being less than the largest diameter of said reentrant recess, an annular raceway on said valve member extending around the lower end thereof, a complementary annular raceway on the holder, an annulus of balls between the raceways, said holder having an axial extension projecting upwardly through said opening into said recess of the valve member, said holder having an axial bore therethrough, and means for permanently and rotatably securing the holder with the valve member comprising a plurality of integral segments defined by longitudinally extending slots in the upper end of said axial extension, each said segment having an upper end portion of radially enlarged cross section connected with the holder by a lower end portion of reduced radial cross section, said upper end portion of said segment having a curved outer surface having a radius of curvature less than the radius of curvature of said annular seating surface, said recess in said valve member having an annular seating surface extending radially outwardly from the upper end of the opening at an angle with the axis of said opening and forming a shoulder, each said segment being permanently deformed beyond its elastic limit at said radially reduced portion in a radially outwardly direction to a position wherein said curved outer surface is closely adjacent said shoulder so as to permanently secure together the holder and the valve member and permit free rotation of said holder and at the same time to permit said segments to engage said shoulder in radial line contact, each said segment having its upper end portion extending radially inwardly of said bore prior to its being deformed outwardly, the radially innermost portions of the upper end portions of said segments defining a circle concentric with the axis of the bore, said bore extending to said segments and providing a pilot passageway for a tool which when driven upwardly through the bore past said shoulder during assembly is adapted to engage the radially inwardly extending portions of said segments to permanently deform the segments radially outwardly into closely adjacent relationship to said shoulder, a washer, means for removably securing said washer on the lower end of said holder, the position of said segments being unaffected by operation of said latter means to effect removal of said washer.

References Cited in the file of this patent

UNITED STATES PATENTS

| | | |
|---|---|---|
| 1,186,829 | Pohlman | June 13, 1916 |
| 1,694,595 | Howard | Dec. 11, 1928 |
| 1,913,381 | Grass | June 13, 1933 |
| 2,216,459 | Siclari | Oct. 1, 1940 |
| 2,302,590 | Waite | Nov. 17, 1942 |
| 2,353,851 | Rosan | July 18, 1944 |
| 2,389,479 | Austin | Nov. 20, 1945 |
| 2,616,328 | Kingsmore | Nov. 4, 1952 |

FOREIGN PATENTS

| | | |
|---|---|---|
| 3,866 | Great Britain | of 1879 |
| 25,749 | Great Britain | Nov. 28, 1908 |
| 535,652 | Great Britain | Apr. 17, 1941 |